United States Patent [19]
Kohlert et al.

[11] 4,320,675
[45] Mar. 23, 1982

[54] MANDREL FOR THE COAXIAL EXTERNAL MACHINING OF WORKPIECES WITH INTERNAL TOOTHING

[76] Inventors: Rudolf Kohlert, Danzieger Strasse 3, 8751 Stockstadt; David Fischer, Mainparkstrasse 6096, 8752 Mainaschaff, both of Fed. Rep. of Germany

[21] Appl. No.: 158,030

[22] Filed: Jun. 9, 1980

[30] Foreign Application Priority Data

Jun. 20, 1979 [DE] Fed. Rep. of Germany ....... 2924802

[51] Int. Cl.³ ..................... B23B 25/00; B23B 5/22
[52] U.S. Cl. ..................................... 82/43; 279/1 G
[58] Field of Search ............... 82/43; 279/1 G, 1 S, 279/1 T, 1 R, 2 R

[56] References Cited

U.S. PATENT DOCUMENTS

| | | | |
|---|---|---|---|
| 2,372,931 | 4/1945 | Bregin | 82/43 |
| 2,665,136 | 1/1954 | Fallon | 82/43 X |
| 2,805,864 | 10/1957 | Parker et al. | 279/1 G |
| 2,806,705 | 9/1957 | Parker et al. | 279/1 G |

FOREIGN PATENT DOCUMENTS

185196  4/1956  Austria ........................... 82/43

*Primary Examiner*—Harrison L. Hinson
*Attorney, Agent, or Firm*—Sprung, Felfe, Horn, Lynch & Kramer

[57] ABSTRACT

In a mandrel for the coaxial external machining of workpieces with internal toothing, a reception sleeve with an external toothing corresponding to the workpiece toothing and having openings along the clamping length extending only on a portion of the circumference of the reception sleeve is provided wherein the reception sleeve is integral over the entire clamping length. A clamping member is disposed with tangential and radial play in the reception sleeve for engaging the workpiece toothing and is thereby turnable with respect to the reception sleeve by which the internal toothing of the workpiece can be brought to bear against the external toothing of the reception sleeve in a circumferential direction. The ends of the clamping member extend through the openings for engaging the workpiece toothing and circumferential parts of the reception sleeve and the ends of the clamping member alternate. The clamping member is turned between a clamping and an unclamping position by a rod.

33 Claims, 21 Drawing Figures

FIG.15

MANDREL FOR THE COAXIAL EXTERNAL MACHINING OF WORKPIECES WITH INTERNAL TOOTHING

BACKGROUND OF THE INVENTION

The invention relates to a mandrel for the coaxial external machining of workpieces with internal toothing, consisting of a reception sleeve with an external toothing corresponding to the workpiece toothing, and also a clamping member that engages with the workpiece toothing and that can be rotated with respect to the reception sleeve by means of a rod arranged within said reception sleeve, by means of which clamping member the internal toothing of the workpiece can be brought to bear in a circumferential direction against the external toothing of the reception sleeve.

Such mandrels are used for a whole range of applications. A particularly important field of application is the manufacture of gears and coupling parts whose boss has an internal toothing by means of which they can be rigidly mounted on a shaft having the corresponding external toothing. For example, in the case of gears the pitch circle of the gear rim must be arranged as concentrically as possible with respect to the axis of the inner toothing, since otherwise drive systems in which such gears are used will produce considerable running noises. The coaxial position of the pitch circle of the gear rim with respect to the axis of the internal toothing assumes that the gear is completely centered while being machined by milling, planing and grinding, etc. The centric clamping of the gear is particularly important if, during one of the first work stages, a cylindrical twisting force is produced on the outer surface of the gear that is intended to clamp the workpiece during its further machining. Any errors in alignment would of course have an additive effect in the most unfavorable case, with the result that the deleterious effect on a finished gear would be magnified even further. A whole series of mandrels are known for clamping workpieces as centrically as possible, but these do not satisfy all the postulated requirements. With regard to the shape and contour of the teeth profile, the DIN Standards 5480 and 5482 have to be observed in most applications.

While they are being machined, the workpieces provided with internal toothing are to be held on the mandrel under conditions, insofar as possible, which will be identical with their final mounting on a complementary shaft provided with external toothing. The unachievable ideal would be a one-piece, massive, seamless mandrel without any cross-sectional reduction or the like.

The invention is therefore directed to the primary object of creating a mandrel on which the workpiece will be held during machining just about as securely as it will be after its final installation. It is against this background that the following is set forth regarding the state of the art.

U.S. Pat. No. 2,806,705 does not disclose a mandrel whose reception sleeve is continuous over the entire clamping length. Instead, in the area of the clamping length the mandrel consists of a total of three parts which are disposed in axial succession and are rotatable relative to one another, and it is intended for the simultaneous clamping of a plurality of workpieces. Since the workpieces rotate a relative to one another, the external toothing of the two workpieces has a different angular position with respect to the internal toothing.

The radial divisions between the parts result in a considerable weakening of the moment of resistance, so that the workpieces can be deflected resiliently under the machining forces. Deflection can be countered only partially by means of an extremely slight radial clearance between the relatively movable parts. In this case, however, another disadvantage manifests itself, the cause of which lies in unavoidable inaccuracies in the toothing both on the mandrel and on the workpiece. A clamping member having a plurality of teeth accordingly first comes into contact with the workpiece with only one tooth. On account of the curved shape of the toothing (involute engagement angle), this results in a radial component of force at the first point of contact. Since this component of force is initially unopposed by any reaction force, the workpiece is positively forced away from the (assumed) concentric position until additional, i.e., thinner, teeth on the workpiece make contact.

U.S. Pat. No. 2,805,864 discloses a mandrel having within its clamping length two parts and a division between them. The first part is made in the form of a ring with external toothing, and it is held on the other part by means of three screws distributed on the circumference. The ring has to be made removable because otherwise the shaft could not be assembled with the clamping member.

There is virtually no way of compensating for the considerable weakening of the moment of resistance caused by the division (the cross section is interrupted precisely in the outer circumference). The shaft is of virtually no help in stiffening. Radial displacement of the ring is prevented by the external prolongation of the shaft. To enable the ring to be supported on the prolongation there must be a very close fit both between the ring and the prolongation and between the shaft and the bore. This close fit, however, simultaneously prevents the shaft and the clamping member from being deflected under any radial forces, so that excentric radial forces between workpiece and clamping member again must result in an excentric displacement of the workpiece on the mandrel.

It is to be considered as an additional disadvantage of the known mandrels that the many parts required have to be made with the needed precision, so that the cost and difficulty of design and manufacture are correspondingly great. For small workpiece dimensions (pitch circle diameters less than 25 mm) the known methods of construction are unfeasible for practical reasons.

SUMMARY OF THE INVENTION

The object of the invention is to provide a mandrel of the type described at the beginning with which the maximum possible centering can be achieved with respect to the internal toothing of the workpiece, in which tipping or tilting of the workpiece on the reception sleeve can be reliably prevented even in the case of large external forces, which is simple in construction and is easy to manufacture, which does not accumulate dirt or contaminants that could impair its operation, and whose principle of construction is also adapted to clamp short and flat workpieces so exactly and yet reliable that the front faces of such workpieces can be machined.

The afore-mentioned objective can be achieved in a mandrel for the coaxial external machining of workpieces with internal toothing wherein a reception sleeve is provided with an external toothing corresponding to the workpiece toothing and having openings along the clamping length extending only on a portion of the circumference of the reception sleeve and wherein the reception sleeve is integral over the entire clamping length. A clamping member disposed with tangential and radial play is provided in the reception sleeve for engaging the workpiece toothing and is thereby turnable with respect to the reception sleeve by which the internal toothing of the workpiece can be brought to bear against the external toothing of the reception sleeve in a circumferential direction. The ends of the clamping member extend through the openings for engaging the workpiece toothing and circumferential parts of the reception sleeve and the ends of the clamping member alternate. The clamping member is turned by means including a rod between a clamping and an unclamping position.

When using the object of the invention as a mandrel, the workpiece to be machined is reliably clamped over the whole clamping length, i.e. the axial section accommodated by the mandrel. There is no measurable torsion or twisting of the reception sleeve as such, i.e. the reception sleeve can be considered to be rigid over its whole length. The clamping member lies within the clamping length but without having any noticeable adverse effect on the rigidity and stability of the reception sleeve, since the recesses provided to receive the clamping body only extend over a particularly small section of the circumference of the reception sleeve. The clamping body does not, in particular, constitute an axial extension of the reception sleeve. Since the reception sleeve corresponds, like the internal toothing of the workpiece, to German DIN standards 5480 and 5482, it has a self-centering effect on the workpiece, which cannot be destroyed even by external forces. The self-centering effect is additionally promoted by the normal thread angle of aproximately 30° with respect to the radius of the pitch circle of the toothing. Essentially only the reception sleeve with its external toothing and possibly those parts that connect the reception sleeve to the relevant machine tool have to be manufactured as precision parts. The remaining parts of the mandrel may be manufactured with considerably greater tolerances, (which will be described in more detail hereinafter) without having any adverse effect on the performance. The number of dirt-collecting stripping edges that extend transverse to the fitting direction of the workpiece was kept to a minimum. The unavoidable gaps can also be filled with an elastomeric material without impairing the operation, and fouling and contamination of the mandrel can thus be completely prevented. Since in normal cases all the teeth of the reception sleeve engage with the internal toothing of the workpiece, a subsequent measuring procedure also has no adverse effect which could possibly arise from the internal toothing engaging at another point on the toothing during the measurement. Floating parts that result in a defective concentricity of the workpiece are not present. Also, fairly large tolerances of the internal toothing can be accommodated with the mandrel, in contrast to, for example, a hydraulic mandrel. The rod for the rotational drive of clamping member is subjected exclusively to a rotational moment caused by the clamping force and not to a rotational moment caused by machining forces, and a magnification of the torsional effect by external forces cannot occur. The object of the invention operates practically completely free from wear.

By virtue of the arrangement of the clamping member with radial play and also with tangential play in the reception sleeve and also of the mounting of the rod for twisting the clamping member with radial play in the reception sleeve it is not necessary for the clamping member and its ends engaging in the workpiece toothing to be precision machined. The clamping member can freely adjust itself in the workpiece and in the reception sleeve and consequently transmits exclusively a rotational moment and tangential forces, and no kind of radial reaction forces that could have an adverse effect on the centering. The torsional ability of the clamping member depends on a corresponding drive, determined as a rule by the machine factors. According to a further feature of the invention, such a drive is characterized in that a torsion device that can be actuated by axial forces is arranged on the end of the rod remote from the clamping member, which device consists of at least two planes connected to the rod and inclined with respect to the mandrel axis, and of a pressure member connected to the inclined planes of the rod by at least two corresponding and completely untorsionable planes. When pressure is exerted by the pressure member, the pair-wise-related inclined planes screw into one another, whereupon the rod executes a rotational compensatory movement that is communicated to the clamping member. Such a torsion device can be made extremely compact, particularly in the case of a mandrel that is designed to be mounted between machine tool centers.

A torsion device that exhibits a particularly low degree of wear with respect to the contact surfaces that slide on one another and by means of which large rotational moments can be produced is characterized according to a further feature of the invention in that a disc is rigidly secured to the end of the rod, in whose free front face are arranged the inclined planes, and that a bearing plate rigid with respect to the reception sleeve is located opposite the disc, in which bearing plate are arranged at least two pressure pins that can be displaced parallel to the mandrel axis, and which have an inclined plane at one of their ends whose position and inclination is adapted to the corresponding inclined plane of the disc, and at their other end rest against the pressure member. The pressure pins which, with the exception of the inclined planes, are preferably formed as cylindrical pins, can execute a rotational movement with the disc, while the pressure pins slide on their inclined planes producing an associated rotational movement, with the result that a flat bearing engagement is ensured at all times. The two inclined planes in the disc are advantageously formed from the sides of a V-shaped diametric recess in the disc. The pressure pins advantageously have two symmetrical inverted V arms whose included angle matches the included angle of the recess in the disc.

In order to exclude any influence of radial component forces of the torsion device on the rod and clamping member, it is proposed according to a further feature of the invention to arrange the disc in a radially displaceable manner on the end of the rod, the direction of displacement running at right angles to the radii lying in the inclined planes. Any lateral misalignment of one or both pressure pins will simply result in the disc being urged against the rod, whereby even considerable deviations can be compensated.

In order to reliably prevent any overloading of the torsion device caused by faulty operation, it is furthermore proposed to surround the pressure member by a pressure sleeve that is supported via a spring element on the pressure member, and for one end of the pressure sleeve to co-operate with a stop surface on the mandrel, the length of the pressure sleeve and spring element being matched to one another so that the pressure sleeve abuts the stop surface without the pressure element being completely compressed. By virtue of such a structure feature, the maximum axial force exerted on the torsion device is produced by the spring force at a given compression.

If it is not intended to mount the reception sleeve between machine tool centers, it is conveniently secured by means of a shrinkage seat in a base member provided with a securing flange, the base member at least partially enclosing the torsion device. The shrinkage seat has the advantage that is simply depends on an exact cylindrical machining of the reception sleeve and the corresponding counterbore in the base member. Such machining is generally easy to perform.

Since it is desired to weaken the reception sleeve as little as possible in its transverse cross-section, the clamping member is preferably formed as a flat splice plate and passes through the rod diametrically with an appropriate degree of tangential play. If, in this connection, the contract faces between the clamping member and rod are also slightly convex, the clamping member can compensate for any dimensional deviation at the points of contact which could result in a radial reaction force on the workpiece.

The clamping member formed as a flat splice plate may be of various shapes. In the case of a reception sleeve with an even number of teeth, both ends of the clamping member have a profile corresponding to the gap between two adjacent teeth of the workpiece toothing. If however the reception sleeve is provided with an odd number of teeth, one end of the clamping member has a profile corresponding to the gap between two adjacent teeth of the workpiece toothing, while the other end has a bifurcated profile corresponding to the tooth profile.

In addition, in order to compensate for any unequal distribution of the forces exerted on the torsion device, a cardan joint may advantageously be arranged between the pressure member and the pressure pins, and in the simplest case consists of a universal ball joint mounted in a spherical recess.

The afore-described torsion device is generally used on machines having a power-operated clamping device. In the case where a machine tool has no specific device of this type, the torsion device can be provided either additionally or exclusively with manually operated torsion device. According to a further feature of the invention, such a mandrel is characterized in that a torsion device actuated by radial forces is arranged on the end of the rod remote from the clamping member, and consists of a disc acting on the rod and having a radial lug whose one face engages with a spring-loaded pressure pin and whose opposite face engages with a threaded spindle. This threaded spindle can be adjusted by hand, for example by means of an Allan key. In order for the adjusting forces not to result in any overloading of the torsion device, it is expedient to use the threaded spindle only for unclamping purposes, clamping being effected by the spring-loaded pressure pin. This is achieved by adjusting the direction of force of the spring-loaded pressure pin so that the clamping member can be brought into the "clamping" position. In this connection, it is particularly convenient to couple the disc to the rod via a "dead travel" acting in the circumferential direction, the dead travel acting only in the "unclamping" direction. If in fact the threaded spindle is screwed in too far by hand, the dead travel prevents the rod from being "overtwisted" beyond the center position of the clamping member to another position in which a clamping procedure would take place one more.

In order to clamp particularly short or flat workpieces, it is also advantageous to arrange the clamping member at the free end of the clamping length "L", and to arrange the ends of the clamping member in front end openings on the reception sleeve. This arrangement too maintains the condition that the ends of the clamping member engaging in the workpiece toothing alternate with the circumferential parts of the reception sleeve. In order for the clamping member not to be lost in such an arrangement, it is advantageously secured to the rod. The end-face arrangement of the clamping member also provides the possibility of having a clamping member with a roughly tri-stellate cross-section.

The embodiment of the mandrel for mounting a workpiece between machine tool centers generally lacks the flanged base member, which also serves to receive the torsion device. Consequently, the torsion device must be mounted in an appropriately extended reception sleeve. This is particularly conveniently effected by making the pressure member in the form of a threaded bolt and arranged a club-shaped transmission member between the inclined planes of the rod and the pressure member, which transition member is untorsionable with respect to the reception sleeve but is mounted in a longitudinally movable manner and has two inclined planes that coincide as regards position and inclination with the inclined planes of the rod. In this connection, the transmission member is conveniently mounted so as to be able to oscillate in the reception sleeve.

In the case of a rotatable mandrel there is the requirement that it must turn accurately about the axis, i.e. the axis must be neither eccentric nor skew. In order to be able to carry out the necessary adjustments on the machine, it is proposed according to a further feature of the invention that the base member, which contains the reception sleeve on the front face, has a partially spherical surface on its rear face, the midpoint of the spherical surface lying in the mandrel axis, and that a coaxial disc having a spherical recess for the spherical surface is associated with the latter and is radially adjustably mounted in a corresponding recess of a reception member. It is thereby possible by means of appropriate adjusting screws to compensate for all positional deviations of the mandrel axis in an optimum and simple manner.

An especially advantageous torsion device is, in accordance with a further feature of the invention, characterized in that the torsion device has at least two balls mounted in guides radial to the axis, which are tightenable in the radial direction by clamping means that can be operated from without, and it also has at least two "oblique surfaces" disposed on the rod and at an angle to the rod radius, on which the balls can roll upon movement of their centers, producing a twisting movement of the rod.

The further feature of the invention is thus based upon the use of balls which convert a radial movement of their centers to a twisting movement of the rod, that is, to a torque. Suitable balls, which for example can also be used for ball bearings, are obtainable commercially and combine a high surface quality and hardness with very close diametrical precision. Balls roll on their contact surface with low friction, so that the release of the turning device is also easily possible. The required number of balls (no more than two or three balls are used so as to avoid over-determination of the system) can easily be installed on the circumference of the rod or of a head joined to the rod, without making the radial dimensions unnecessarily large. The centers of all balls are best situated in one radial plane of the system in order to avoid skewing the driving or driven parts. As it will be apparent from the embodiments explained below, the use of balls reduces the number of parts involved in the turning device to a minimum. Due to the small radial and axial dimensions, the weight of the mandrel can also be considerably reduced. Reducing the number of parts further more considerably reduces the number of tolerances that have to be maintained. In contrast to the turning devices of the prior art, the ball system of the invention can be driven either by a power drive present on the machine or by hand, without any loss of the action of clamping the workpiece on the mandrel. This advantage is not to be underestimated in connection with machine tools which do not have a power clamping drive.

The "oblique surfaces" have in principle the action of inclined planes, the term "oblique" being understood with reference to a tangent to the body on which the oblique surface is disposed. The position of the tangent is determined by the radius of the rod etc., on which the center of the ball moves. Setting out from the position of the ball with respect to the oblique surface in the state of rest or in the released position, radial pressure on the ball causes the ball to shift towards the mandrel axis, rolling on the oblique surface and turning the latter and with it the rod in the circumferential direction, thereby producing the desired torque for the clamping member.

An especially advantageous embodiment is, according to a further feature of the invention, characterized in that the "oblique surfaces" are cylinder part surfaces whose axes are in a plane radial to the mandrel and are at angle of about 45 degrees to those radii of the rod which coincide with the axes of the guides of the balls, and in that the radius amounts to 1.01 to 1.15 times, preferably to 1.08 times, the ball radius. It is easy to make such oblique surfaces with the desired attitude angle of their generatrices by means of a cylindrical mill. The slightly greater radius of the cylinder part surfaces with respect to the balls results in a good distribution of the contact stress while preventing the balls from binding.

An especially compact construction of the mandrel can be achieved if the radial guides of the balls are disposed in a prolongation of the reception sleeve of the mandrel. This prolongation can be made integral with the reception sleeve, and it can also be joined with the reception sleeve by welding or any other kind of fastening. By this measure the reaction forces acting on the balls upon tightening are transmitted directly to the reception sleeve and the workpiece which is simultaneously stressed with the clamping torque by the clamping member. The flow of force is thus completed by the shortest path and the shunting of the force through a bearing plate, a base body or the like, is unnecessary.

BRIEF DESCRIPTION OF THE DRAWINGS

Embodiments of the object of the invention and its method of operation will be described in more detail hereinafter, with the aid of the accompanying FIGS. 1-21, in which.

DETAILED DESCRIPTION OF THE INVENTION

The mandrel according to FIGS. 1-4 consists of a one-piece, compact reception sleeve 20 which is coaxially mounted by means of a shrinkage seat in a base member 21 with a securing flange 22. The mandrel further consists of a clamping member 23 and a rod 24, the clamping member 23 being formed as a flat splice plate which passes diametrically and with all-around play through both the reception sleeve 20 and the rod 24. The end of the rod 24 remote from the clamping member 23 is provided with a head 25 which has a rectangular cross-section and engages in a disc 26 provided with a diametric groove 27 in which the head 25 engages. The disc 26 can move by a specified amount in the direction of the groove 27 and in the direction of the long axis of the head 25.

Figures 1, 2, 3, 4, 5:
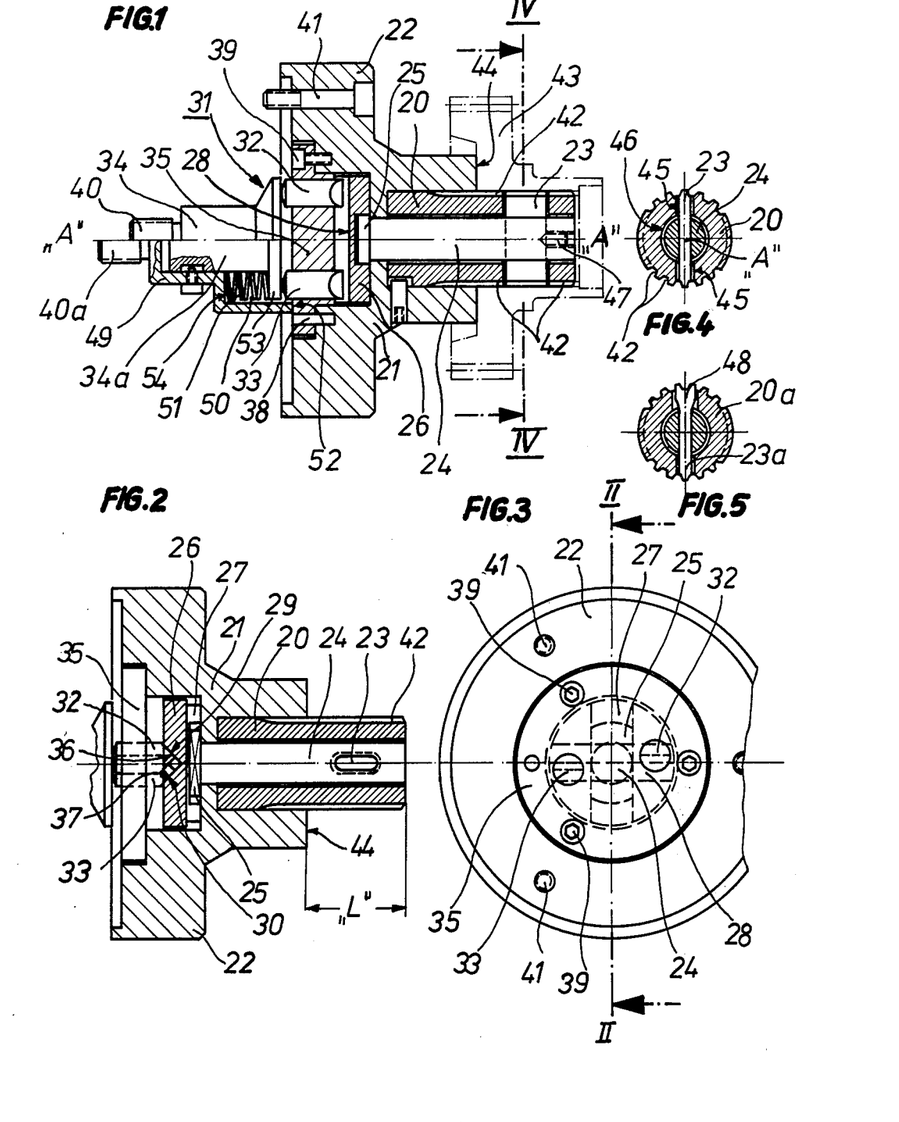
FIG. 1 is an axial section through a mandrel having a base member and securing flange.
FIG. 2 is an axial section through the mandrel according to FIG. 1, but displaced by 90°.
FIG. 3 is a plan view of the mandrel according to FIG. 2, from the left.
FIG. 4 is a section through the mandrel according to FIG. 1, along the line IV—IV.
FIG. 5 is a variant of the mandrel according to FIG. 4, for a workpiece having an odd number of teeth.

The disc 26 has a V-shaped diametric groove 28 on the side opposite the groove 27, which groove 28 runs perpendicular to the groove 27. The groove 28 is bounded by two inclined plane surfaces 29 and 30 (FIG. 2). The disc 26 is part of a torsion device 31, which also comprises two cylindrical pressure pins 32 and 33 as well as a pressure member 34. The pressure pins 32 and 33 are longitudinally movably mounted in a bearing plate 35, the axes of the pressure pins running parallel to the mandrel axis A—A. The pressure pins are provided at one end with roof-shaped inclined faces that form two inclined plane surfaces 36 and 37 whose inclination corresponds to that of the inclined plane surfaces 29 and 30. In each case, the opposite inclined plane surfaces (here not described in more detail) of the pressure pins are not important for the operation of the device. The pressure pins 32 and 33 are arranged somewhat displaced in the circumferential direction with respect to the groove 28 in the unclamped position of the disc 26, as can be seen from FIGS. 2 and 3. In this way, one of the pressure pins 32 comes into contact with the inclined plane surface 29, and the other pressure pin 33 with the inclined plane surface 30 (FIG. 2). If the pressure pins are now moved by means of the pressure member 34 from the unclamped position as illustrated into the clamped position, the pressure member 34 executing a movement to the right, the disc 26 is rotated by a certain angular amount on account of the mutual sliding movement of the inclined plane surfaces 29/36 and 30/37, the rotational movement being communicated via the rod 24 to the clamping member 23. The pressure pins 32 and 33 are themselves fixed in the circumferential direction since the bearing plate 35 is rigidly arranged in the base member 21 by means of a cylindrical pin 38 and screw 30.

The pressure member 34 has a threaded peg 40 by means of which it can be connected to a power-operated clamping device on the machine. In this connection, the securing flange 22 is connected via a screw 41 to a corresponding machine flange.

As can be seen from FIGS. 1, 2 and 4, the reception sleeve 20 has an external toothing 42 corresponding to the internal toothing of a workpiece 43, shown in dash-dotted outline. The length of the part of the reception sleeve 20 projecting from the base member 21, which is available for clamping the workpiece, is designated as the so-called clamping length "L" (FIG. 2). The workpiece 43 in the end position bears against an exactly radial stop surface 44 of the base member 21. The diametrically opposite ends of the clamping member 23 have a profile that corresponds as far as possible to the profile of the external toothing 42 and complements the profile of the external toothing 42 in the unclamped position (FIG. 4). For the purpose of passing the clamping member 23 through the reception sleeve 20, the latter is provided at diametrically opposite points with recesses 45 whose cross-section is somewhat larger than the cross-section of the clamping member 23, in order for the latter to be able to execute a slight rotational movement about the axis A in the recesses. The reception sleeve 42 has a longitudinal bore 46 that is slightly larger than the external diameter of the rod 24. In this way the clamping member 23, which is prevented by a grub screw 47 from slipping sideways out of the rod 24, together with the rod 24 can execute a slight radial movement so that the clamping member 23 can adapt at both ends to any inaccuracies in the workpiece toothing. The clamping member 23 consequently exerts no radial force components on the workpiece 43, and the latter can thus be centered optimally on the external toothing 42. One of the contact surfaces between the clamping member 23 and rod 24 is advantageously also made convex so that the clamping member is guided within the rod 24 in the manner of a ball-and-socket joint and can perfectly adapt to the surface geometry of the workpiece toothing.

As soon as the pressure member 34 exerts a force, the disc 26 is twisted via the pressure pins 32 and 33. This rotational movement is transmitted to the head 25 and rod 24, as well as to the clamping member 23, which consequently execute a rotational movement relative to the external toothing 42, about the mandrel axis A—A. The workpiece toothing together with all the faces lying on one side is thereby pressed against all the faces of the external toothing 42, which similarly lie on one side, resulting in the self-centering procedure described above. Since the clamping takes place in the direction of the applied force, the forces produced by the machining process are transmitted exclusively by the workpiece 43 to the external toothing 42. The clamping member 23 and the rod 24 remain unaffected by the external applied force. The mandrel can be unclamped and the workpiece removed by retracting the pressure member 34. It can also be seen from FIG. 4 that the ends of the clamping member 23 and circumferential parts or segments of the reception sleeve 20 alternate, looking in the circumferential direction, on the point of penetration by the clamping member 23 and reception sleeve 20. Since the reception sleeve 20 has been drawn over the clamping member 23, the workpiece 43 cannot tip or become misaligned on the reception sleeve 20. It is particularly advantageous if the clamping member 23 lies approximately in the center of the clamping length "L", as shown in FIG. 2.

A reception sleeve 20 in conjunction with a clamping member 23, as shown in FIG. 4, is provided for mounting a workpiece 43 having an even number of teeth in the internal toothing. FIG. 5 shows the necessary modifications to the cross-section of the reception sleeve 20a and clamping member 23a if the mandrel is intended for mounting a workpiece having an odd number of teeth. In this case the profile of one of the ends of the clamping member 23a corresponds to the profile of both ends of the clamping member 23 in FIG. 4. The other end however has a bifurcated profile 48, corresponding to the teeth profile. The remaining constructional features of the embodiment according to FIGS. 1–4 are also kept unchanged in the mandrel according to FIG. 5.

A variant with regard to the design of the pressure pin 14 is illustrated in the lower half of FIG. 1. The pressure member 34a shown there is surrounded by a pressure sleeve 43 that encloses, on part of its length, an annular space 50 between itself and the pressure member 34a, in which annular space is mounted a spring unit 51 consisting of a plurality of Belleville springs. The pressure sleeve 49, on which a threaded peg 40a is secured, can execute longitudinal movements with respect to the pressure member 34a if the axial force to which the spring unit 51 is subjected is exceeded. The threaded peg 40a is secured on the pressure sleeve 49 and together with the latter displaces the pressure member 34a to the right as long as the biasing or prestressing force on clamping a workpiece is not exceeded. If however the prestressing force is exceeded, the pressure member 34a comes to rest and the pressure sleeve 49 moves to the right, subjecting the spring unit 51 to increasing compression, until the end of the pressure sleeve 49 with a stop surface 52 bears against the mandrel, the stop surface being identical to a front end of the bearing plate 35. The lengths of the pressure sleeve 49 and spring unit 51 as well as the spring characteristics are adjusted to one another so that the pressure sleeve abuts the stop surface before the spring unit is completely compressed. This arrangement has the effect that the torsion device 31 can only be subjected to a maximum force, corresponding to the resistance of the spring at maximum compression, and accordingly can be controlled. The spring unit 51 is supported on one hand on a flange 53 of the pressure member 34a, and on the other hand on a stepped surface 54 of the pressure sleeve 49.

Figures 6, 7, 8:
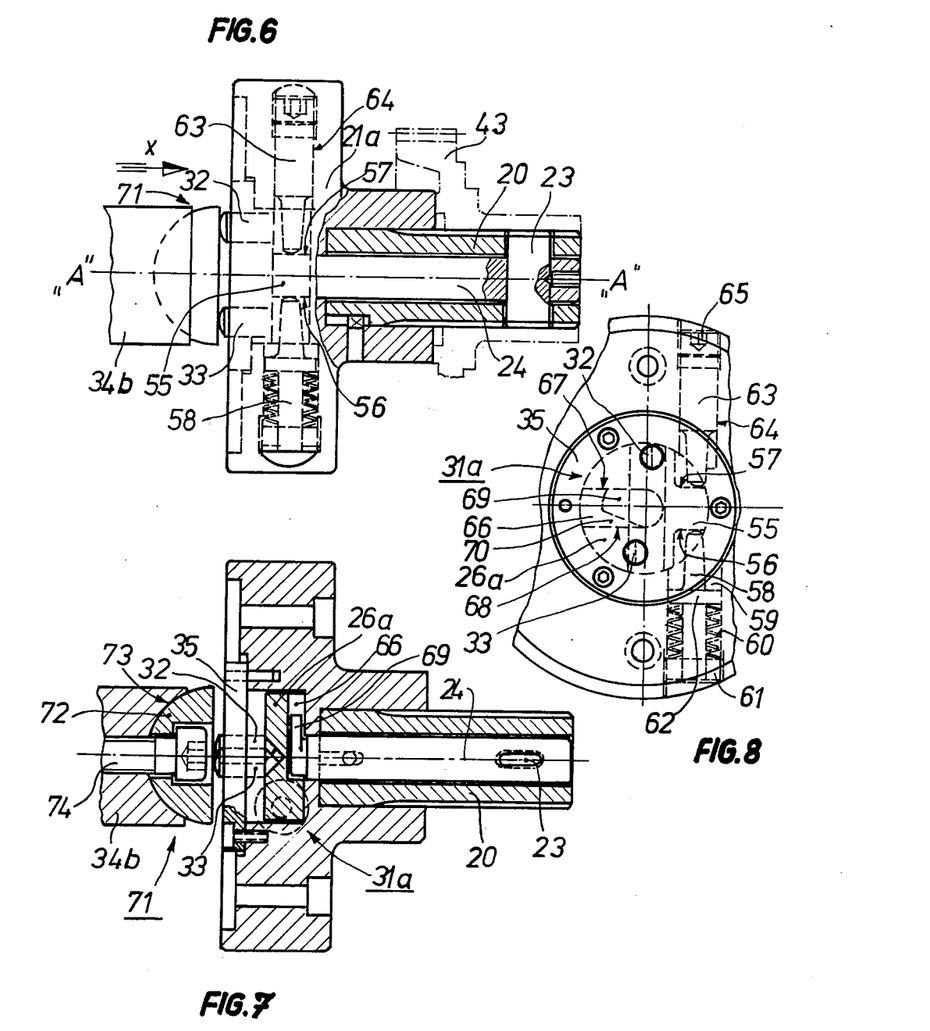
FIG. 6 is an axial section through a mandrel having a base member and securing flange similar to that shown in FIG. 1, but with an additional, hand-actuated torsion device.
FIG. 7 is an axial section through the mandrel according to FIG. 6, displaced by 90°.
FIG. 8 is a plan view of the mandrel according to FIG. 6, from the left.

In the mandrel according to FIGS. 6, 7 and 8, the basic parts of the reception sleeve 20, clamping member 23 and rod 24 are unchanged. The machine-operated drive system for the torsion device 31 by means of the pressure pins 32 and 33 has similarly been retained. In the embodiment illustrated here, the torsion device 31 is however augmented by an additional device that permits a manual clamping and unclamping of the workpiece 43. For this purpose, an altered disc 26a is used, which has been provided, by means of two milled-out sections, with a radial lug 55 having two parallel sides 56 and 57 (FIGS. 6 and 8). A pressure pin 58 arranged longitudinally movably in a bore 59 in the base member 21a acts on the side 56 and is under the action of a pre-tensioned spring unit 60 consisting of Belleville springs. The bore 59 is closed at one end by a threaded ring 61, which simultaneously serves to guide the pressure pin 58 and as an abutment for the spring unit 60. A collar 62 against which the other end of the spring unit 60 bears, serves as a further guide element. The pressure pin 58 tends to twist the disc 26a in a counterclockwise direction.

A threaded spindle 63 mounted in a corresponding threaded bore 64 in the base member 21a acts on the opposite side 57. The bore 59 and threaded bore 64 are coaxially aligned and lie parallel and laterally displaced adjacent to a diameter of the base member 21a. On tightening the threaded spindle 63 the disc 26a is twisted in a clockwise direction, with compression of the spring element 60, and vice versa. The threaded spindle 63 is actuated by means of an Allan key in conjunction with the hexagonal nut 65.

The disc 26a has a radial recess 66 with parallel sides 67 and 68 on the side opposite the lug 55. A crank arm 69 rigidly connected to the rod 24 projects into this recess (FIGS. 7 and 8). The crank arm 69 tapers towards the outside, with the result that a dead space 70 is formed between it and the side 68, i.e. the disc 26a can freely rotate with respect to the crank arm 69 by an angle corresponding to the magnitude of the dead space 70.

The mandrel according to FIGS. 6, 7 and 8 operates as follows, it being assumed that the torsion device 31a is not driven via the pressure pins 32 and 33. When the threaded spindle 63 is unscrewed, the pressure pin 58 rotates the disc 26a in a counter-clockwise direction, under the action of the spring unit 60. The side 67 thus presses on the crank arm 69 and twists the rod 24 and thus the clamping member 23 in the "clamping" direction. To unclamp, the threaded spindle is screwed into the base member 21a, the disc 26a turning in a clockwise direction and thus compressing spring unit 60 via the lug 55 and pressure pin 58. The crank arm 69 is simultaneously freed and accordingly it, together with the rod 24 and clamping member 23, can move to the "unclamped" position. If now the threaded spindle 63 is screwed further into the base member 21a, the spring unit 60 is of course further compressed by the rotation of the disc 26a, but the crank arm 69 can no longer follow this movement since the side 68 now approaches the crank arm 69, utilizing the dead space 70. Unintentional clamping in the opposite direction is thereby prevented.

The mandrel according to FIGS. 6–8 comprises a cardan joint 71 consisting of a spherical cup 72 and a corresponding counter surface 73 in the pressure member 34b, and located between the pressure member 34b and the pressure pins 32 and 33. The spherical cup is retained with a restricted movement and by means of a screw 74 on the pressure member 34b. The cardan joint 71 causes the pressure pins 32 and 33 to be subjected to the same axial forces, with the result that the force components on the inclined plane surfaces exert a pure rotational moment in the circumferential direction.

Figures 9, 10, 11:
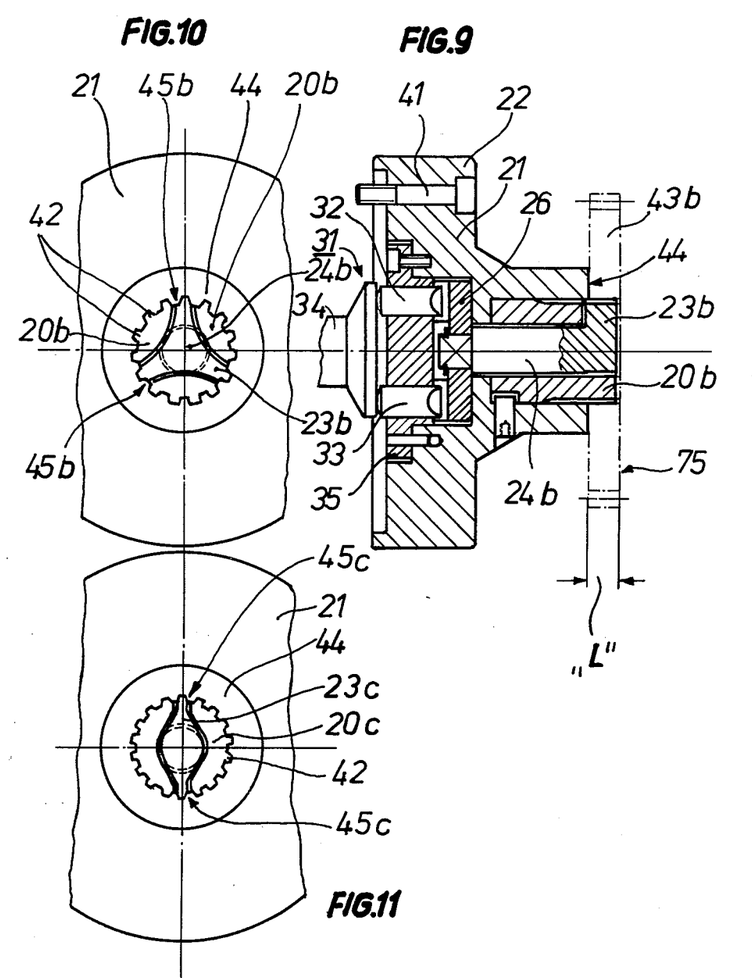
FIG. 9 is an axial section through a mandrel with a base member and securing flange similar to that shown in FIG. 1, in a special form for particularly short and flat workpieces.
FIG. 10 is a plan view of the mandrel according to FIG. 9, from the right.
FIG. 11 is a variant of the mandrel according to FIG. 10.

In the mandrel according to FIGS. 9 and 10, the design of the base member 21 and torsion device 31 is essentially the same as shown in FIGS. 1–3. However, the reception sleeve 20b differs, and projects beyond the stop surface 44 by a substantially smaller amount "L", and serves to clamp a substantially shorter and flatter workpiece 43b, whose front face 75 is possibly to be machined. In the present case the clamping member 23b is formed in the manner of a triple star, i.e. it has three ends whose profile corresponds to the profile of a tooth groove in the workpiece toothing (FIG. 10). The clamping member 23b is arranged in front-end recesses 45b of the reception sleeve 20b and can move in these recesses with respect to the reception sleeve 20b, similar to the manner described hereinbefore. As can be seen from FIG. 10, the present case also meets the condition that the ends of the clamping member 23b engaging in the workpiece toothing, and the circumferential parts of the reception sleeve 20b, alternate. The clamping member 23b is rigidly connected to the rod 24b in order to provide sufficient stability and rigidity.

FIG. 11 shows a variant of the mandrel according to FIG. 10, in which the clamping member 23c is again provided with two ends engaging in the workpiece toothing. The reception sleeve similarly also has on the circumference only two front-end recesses 45c, through which the ends of the clamping member 23c pass. In the cases shown in FIGS. 10 and 11, the ends of the clamping member are augmented by the external toothing 42 of the reception sleeve 20b and 20c to form an essentially closed toothed profile as long as the neutral position is maintained.

Figures 12, 13, 14:
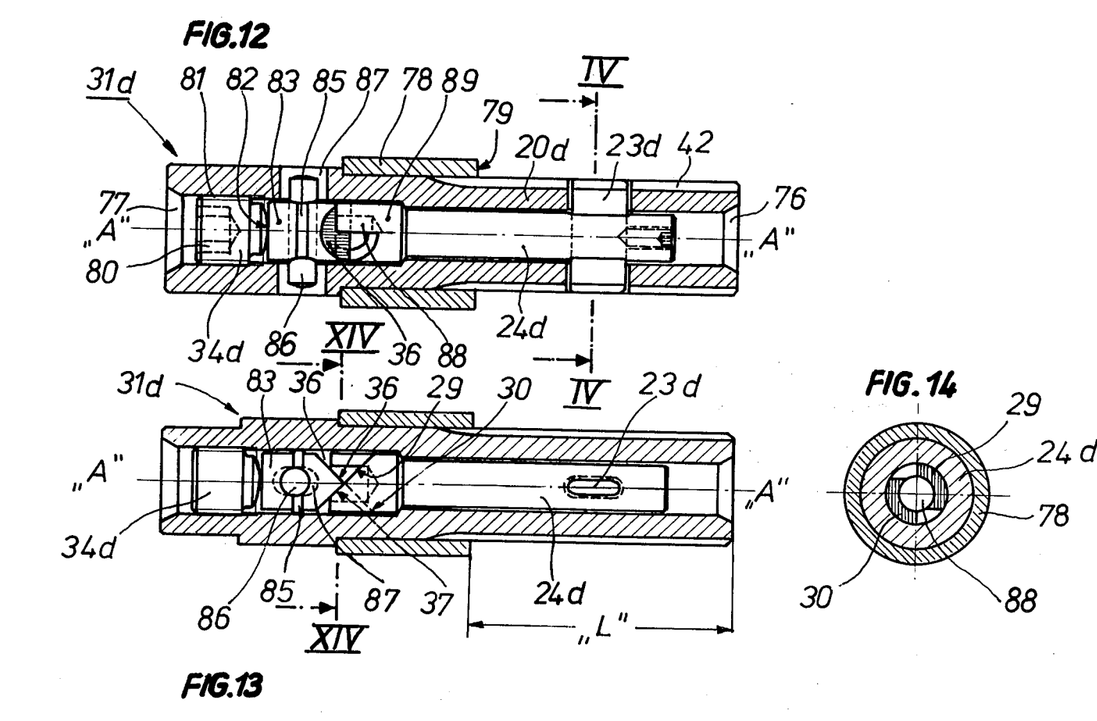
FIG. 12 is an axial section through a mandrel for use between machine tool centers.
FIG. 13 is an axial section through the mandrel according to FIG. 12, displaced by 90°.
FIG. 14 is a section through the mandrel according to FIG. 13, along the line XIV—XIV.
Figure 15:
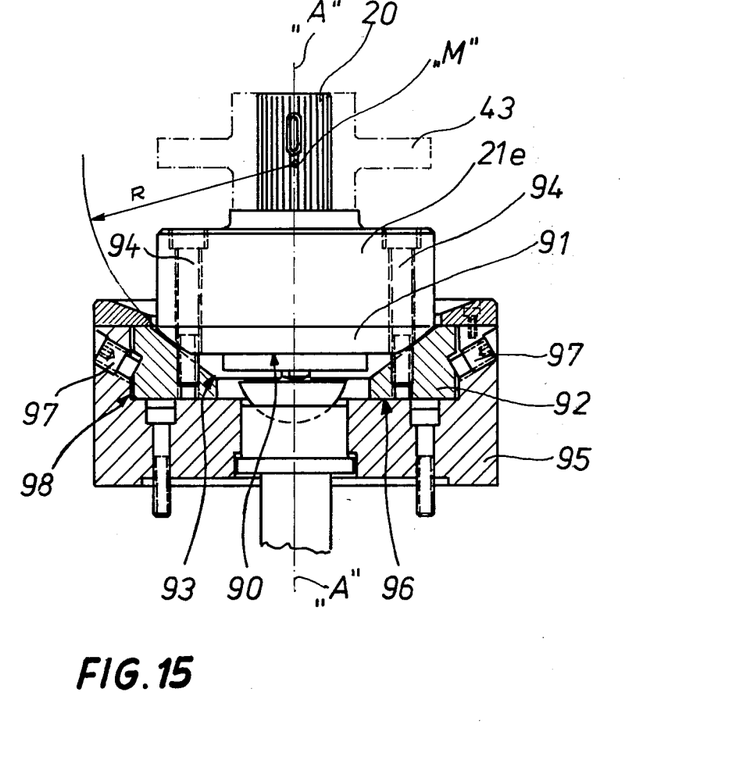
FIG. 15 is an axial section through a mandrel with a base member and securing flange and additional devices for compensating positional deviations of the mandrel axis.

The mandrel of FIGS. 12, 13 and 14 is formed as a mandrel for mounting a workpiece between machine tool centers. The reception sleeve 20d has a correspondingly greater length and is provided at both ends with spherical bored surfaces 76 and 77 for mounting machine tool centers. A base member and a securing flange are not included; instead, a stop ring 78 with a stop surface 79 is arranged on the reception sleeve 20d. A pressure member 34 formed as a threaded bolt and provided with a hexagonal sockethead bolt 80 is arranged in the reception sleeve 20d. The pressure member 34d is mounted in a thread 81 and has a spherical pressure surface 82 with which it bears against a club-shaped transmission member 83. The latter is mounted in a longitudinally movable manner in a bore 84, but bears only on a slightly projecting annular surface 89, and accordingly can execute tipping or tilting movements. The transmission member 83 is prevented from being twisted with respect to the reception sleeve 20d by means of a cylindrical pin 86, which passes diametrically through the transmission member 83 and is guided in corresponding longitudinal holes 87 in the reception sleeve 20d. The transmission member 83 has two inclined plane surfaces 36 and 37 arranged in mirror symmetry on its right-hand and, the plane surfaces cooperating with corresponding inclined plane surfaces 29 and 30 arranged, displaced by 180°, on the left end of the rod 24d. A bore 88 is provided between the inclined plane surfaces to provide a sufficient separation thereof. The inclined plane surfaces 29 and 30 are arranged on a head 89 connected as one piece to the rod 24d. A clamping member 23d passes through the rod 24d and the reception sleeve 20d, roughly in the middle of the clamping length "L" and in agreement with the mandrel of FIGS. 1–4, 6 and 7. Since this clamping member is of the same design and operates in the same manner, the description given hereinbefore need not be repeated. The operation of the torsion device 31d in FIGS. 12–14 is as follows: on screwing up the pressure member 34d, the transmission member 83 is moved towards the right, its inclined plane surfaces 36 and 37 sliding on the inclined plane surfaces 29 and 30 on the head 89 of the rod 24d. Since the transmission member 83 cannot execute any rotary movement, the rod 24d together with the clamping member 23d is necessarily rotated, thereby clamping the workpiece (not shown) with its internal toothing in the previously described manner. The mandrel illustrated in FIG. 15 has essentially the same internal structure as the mandrel illustrated in FIGS. 6–8. The only difference is shown by the base member 21e, which has a partially spherical surface 91 (spherical segment) closed around the axis A—A and situated on its rear end 90 remote from the reception sleeve 20, whose midpoint M lies in the mandrel axis A—A and in fact roughly in the center of the clamping length L. A coaxial disc 92 is associated with the spherical surface 91, and has a conical, machined-out recess 93 corresponding to the spherical surface. The base member 21e is fastened with respect to the disc 92 by means of several screws 94 arranged on the circumference. Depending on the degree of tightening of these screws and, within certain limits, on their elasticity, it is possible to swivel the base member 21 in the disc 92 about the midpoint "M" and thereby align up the mandrel axis A—A. The disc 92 is furthermore mounted with an appropriate degree of radial play in a reception member 95, the disc 92 and reception member 95 contacting in a radial plane 96. The reception member 95 comprises a plurality of adjustment screws 97 arranged on the circumference, by means of which it is possible to adjust radially the disc 92 in a recess 98 of the reception member 95. In this way it is possible to eliminate any eccentricities of the mandrel axis "A—A".

Figures 16, 17:
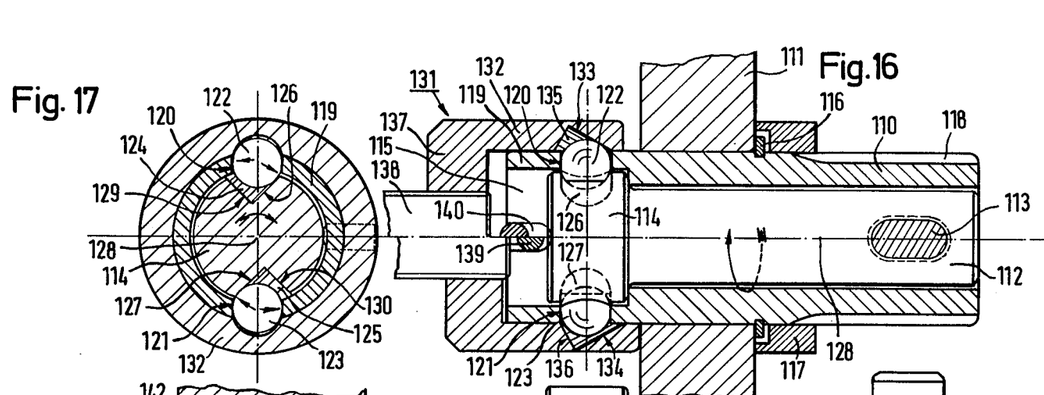
FIG. 16 is an axial section through a mandrel having a torsion device responding to tension.
FIG. 17 is a section through the mandrel of FIG. 16.
Figure 18:
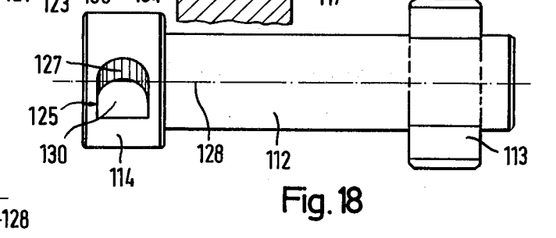
FIG. 18 is a side view of the rod and clamping body in a position displaced by 90° from FIG. 16.

The mandrel in FIGS. 16 to 18 consists of a one-piece, stubby reception sleeve 110 which is mounted coaxially by means of a shrink fit in a securing flange 111. It consists furthermore of a rod 112 and a clamping member 113 which is in the form of a flat gib passing diametrically with all-around clearance both through the reception sleeve 110 and through the rod 112. The end of rod 112 remote from the clamping member 113 is provided with a head 114 which has a cylindrical profile and is larger in diameter than the rod 112. Both the rod 112 and the head 114 are mounted with radial clearance in the reception sleeve 110, which is provided with an expanded bore 115 for the accommodation of head 114. The reception sleeve 110 is fixed in relation to the securing flange 111 by a snap ring 116 in front of which there is also an abutment 117 for the workpiece which is not shown. For the reception thereof, the reception sleeve 110 has an external toothing 118 corresponding to the internal toothing of the workpiece. As described hereinbefore, the workpiece is pressed circumferentially against the external toothing 118 by the limited turning of the clamping member 113 engaging the workpiece toothing such that the workpiece is held reliably.

In a prolongation 119 of the reception sleeve 110, which contains the counterbore 115, two guides 120 and 121 are disposed at diametrically opposite locations, which are in the form of cylindrical bores. Two balls 122 and 123 are radially movably disposed in these guides and engage in recesses 124 and 125 in the head 114 of the rod 112. The recesses are formed essentially by oblique surfaces 126 and 127 which are in the form of cylinder part surfaces. The axes of the cylinder part surfaces lie in a plane radial to the mandrel axis 128 and are at a 45° angle to those radii of rod 112 and of head 114 which coincide with the radial axes of the guides 120 and 121. This position is related to the clamping position of the torsion device, as shown in FIG. 17. The balls 122 and 123 in this case contact the cylinder part surfaces whose radius amounts to 1.08 times the ball radius. Upon an upward movement of balls 122 and 123 in the direction of the radial arrows, the balls roll on the "oblique surfaces" 126 and 127 and thereby force the head 114 and the rod 112 to a rotatory movement in the direction of the curved arrow around the mandrel axis 128. It is easily understood that in this case the geometrical position of the sloping surfaces 126 and 127 is so coordinated with the freedom of the clamping member 113 to move within the reception sleeve 110 that the clamping member 113 is able to perform a corresponding rotatory movement. Disregarding the fact that the radius of the cylinder part surfaces is slightly greater than the ball radius, the axes of the cylinder part surfaces pass substantially through the ball center. The recesses 124 and 125 terminate in planar bottom surfaces 129 and 130 which, in the clamping position shown in FIG. 17, are sufficiently far away from the ball surface to allow the balls to perform the movement assigned to them within the recesses, as well as to permit the assembly of the clamping device described below, which surrounds the balls.

On the outer circumference of the prolongation 119 of the reception sleeve 110 there is disposed a clamping device 131 which consists of a sleeve 132 which is longitudinally displaceable virtually without clearance in the axial direction of the mandrel. This sleeve has a number of additional oblique surfaces 133 and 134 corresponding to the number of balls, these surfaces being formed by recesses 135 and 136 in the sleeve 132. The oblique surfaces 133 and 134 are also cylinder part surfaces. Their axes lie in a plane passing through the mandrel axis 128 and they are at an angle of 30 degrees to the mandrel axis. The radius of the cylinder part surfaces is again in this case 1.08 times the ball radius. The same considerations apply to the position of balls 122 and 123 within the recesses 135 and 136 as apply to the position of the balls within the recesses 124 and 125. The sleeve 132 is provided on its end remote from the clamping member 113 with an end wall 137 in which an operating rod 138 is fastened, which leads to a power clamping drive which is not shown. By leftward displacement of sleeve 132, the balls 122 and 123 are moved inwardly in the direction of the radial arrows (FIG. 17) on account of the slope of the oblique surfaces 133 and 134, and thereby they produce the above-described rotation of head 114 and rod 112. Upon the reverse movement of sleeve 132 to the right, the clamping is removed again, i.e., the balls return to their farthermost outside position and the rod 112 with clamping member 113 returns to its releasing position. To prevent rotation of sleeve 132 with respect to the reception sleeve 110, a cylindrical pin 139 is disposed between the two and is engaged in an axial slot 140 in the prolongation 119.

Figure 19:
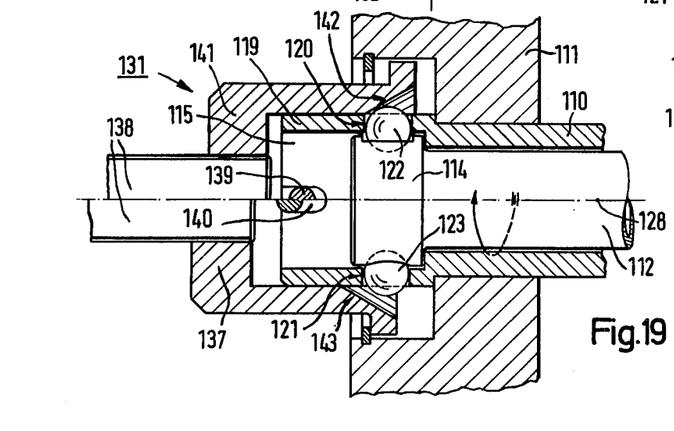
FIG. 19 is an axial section through a variant of the mandrel of FIG. 16, in which the clamping is performed by pressure.

In FIG. 19, parts that are the same as in FIGS. 16 to 18 are provided with the same reference numbers. The only difference is the construction of a sleeve 141 which is provided with oblique surfaces 142 and 143 in the form of cylinder part surfaces whose axes intersect the mandrel axis 128 on the left (instead of the right) of the balls 122 and 123. With this arrangement the tightening of the mandrel is accomplished by a pressure on the sleeve 141 and its rightward displacement, and its release or loosening by a leftward movement of sleeve 141. It is thus possible by the selection of the angular attitude of the oblique surfaces to adapt the direction of operation of the torsioning device to the existing power clamping drive of the maching tool. The angular attitude of the axes of the cylinder part surfaces is not critical; by varying the angle they form with the mandrel axis 128, the transformation ratio can be varied within wide limits.

Figure 20:
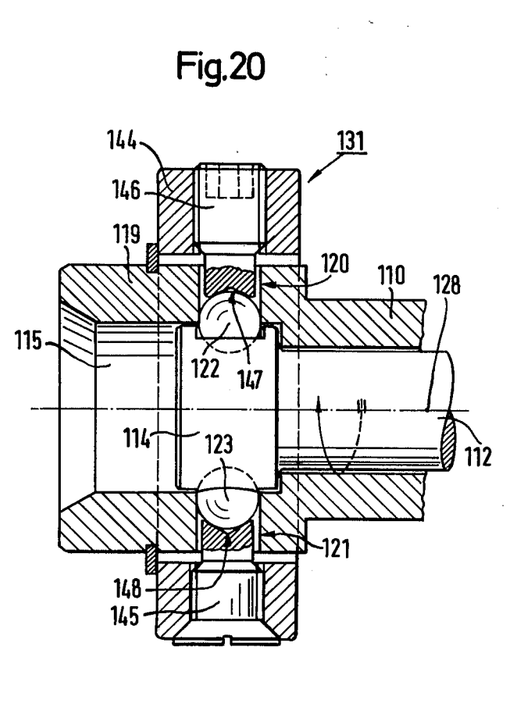
FIG. 20 is an axial section through a mandrel similar to FIG. 19, except that a clamping ring floating radially and having an adjustable pressure screw is provided for the radial movement of the balls.

Also in FIG. 20, the same parts are provided as heretofore with the same reference numbers. The construction of the head 114 and the relative position of the guides 120 and 121 with respect to the recesses in the head 114 are largely the same as in the embodiments represented in FIGS. 16 to 19. In FIG. 20, however, the sleeve 132 or 141 with the corresponding oblique surfaces, mounted largely clearance-free on the prolongation 119 of the reception sleeve 110, is not used, and instead the balls 122 and 123 and guides 120 and 121 are surrounded with considerable radial clearance by a "floating" tightening ring 144 in which a radial abutment screw 145 is provided on the one side, and a radial pressure screw 146 is provided on the diametrically opposite side. Both screws extend to a certain extent into the guides 120 and 121 and are provided on their ends facing the balls 122 and 123 with conical recesses 147 and 148. By turning the pressure screw 146 by hand, by means, for example, of a hollow-headed screw driver, the two balls 122 and 123 can be brought closer together, thereby producing a rotation of the rod 112 by means of the head 114 as in the embodiment shown in FIG. 17. In this case it does not matter that only the pressure screw 146 is radially adjustable. A balancing of position is accomplished by the considerable radial play between the tightening ring 144 and the prolongation 119. It is easy to understand that, by means of the abutment screw 145, an intermediate setting is made which permits the appropriate degree of freedom of the tightening ring 144 towards both sides. An axially symmetrical distribution of force is brought about in this case also without special clearance between the rod 112 and the head 114 and between the reception sleeve 110 and the bore 115.

Figure 21:
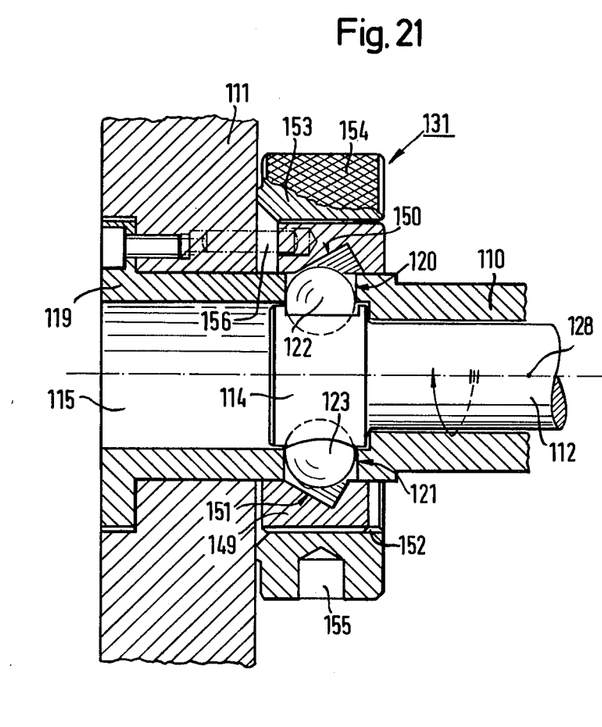
FIG. 21 is an axial section through a mandrel similar to FIG. 19, except that the sleeve forming the clamping means is displaceable axially by means of a threaded ring which can be adjusted by hand.

FIG. 21 represents a variant of the subject of FIG. 19, i.e., the balls 122 and 123 are here again gripped by means of a sleeve 149 having oblique surfaces 150 and 151, whenever the sleeve 149 is moved to the right. The oblique surfaces 150 and 151 are here again in the form of cylinder part surfaces, the cylinder axes intersecting the mandrel axis 128 on the left of the balls 122 and 123. The axial movement of the sleeve 149 is brought about in the present case, too, not by means of a power clamping device, but by hand. For this purpose the sleeve 149 is provided with an external thread 152 on which there is disposed a threaded ring 153. This threaded ring can be provided with knurling 154 (upper half of the figure) and/or with a bore 155 (lower half) for the insertion of a wrench. The threaded ring 153 abuts against the securing flange 111. Depending on the direction in which the threaded ring 153 is turned, the sleeve 149 is moved either to the right (tightening) or to the left (releasing). To prevent sleeve 149 from making a (limited) co-rotation that might result in a binding of the balls, a cylindrical pin 156 is provided between sleeve 149 and the securing flange 111 as an anti-rotational means.

By the appropriate selection of the transformation ratios, which can easily be accomplished by appropriately selecting the angular attitude of the "oblique surfaces", the ball mechanism described above results in such a high gripping effect on the workpiece on the reception sleeve 110 that a reliable holding of the workpiece can be achieved even if the tightening, as indicated in connection with the embodiments shown in FIGS. 20 and 21 is performed by hand.

In regard to FIG. 17, which is to be considered as an approximately full-scale drawing, it is also to be noted that the length of the guides 120 and 121 and the position of the balls 122 and 123 in these guides as well as in the recesses, is such that the balls 120 and 122, at the beginning of their radial inward movement, immediately bear fully on the oblique surfaces 126 and 127, so that at no point is any edge pressure applied to them. As indicated by the arrows in FIG. 17, the forces are transmitted from the oblique surfaces 126 and 127 through the balls 122 and 123 to the guides 120 and 121.

What is claimed is:

1. In a mandrel for the coaxial external machining of workpieces with internal toothing, the improvement comprising: a reception sleeve with an external toothing corresponding to the workpiece toothing and having openings along the clamping length extending only on a portion of the circumference of the reception sleeve and wherein the reception sleeve is integral over the entire clamping length; a clamping member disposed with tangential and radial play in the reception sleeve for engaging the workpiece toothing and thereby turnable with respect to the reception sleeve by which the internal toothing of the workpiece can be brought to bear against the external toothing of the reception sleeve in a circumferential direction, wherein the ends of the clamping member extend through the openings for engaging the workpiece toothing and circumferential parts of the reception sleeve and the ends of the clamping member alternate; and means for turning the clamping between a clamping and an unclamping position.

2. A mandrel according to claim 1, wherein the turning means comprises a rod contacting the twisting member along a contact surface for twisting the clamping member and mounted with a degree of radial play in the reception sleeve.

3. A mandrel according to claim 2, wherein the turning means further comprises a torsion device actuatable by axial forces and coactive with the one end of the rod remote from the clamping member, the torsion device comprising means forming at least two plane surfaces inclined with respect to the mandrel axis and a pressure member connected to the inclined plane surfaces by at least two corresponding inclined plane surfaces that are completely untorsionable.

4. A mandrel according to claim 3, wherein the torsion device further comprises a disc rigidly connected to the one end of the rod and in whose free end face are formed the first mentioned inclined plane surfaces and a bearing plate rotationally fixed with respect to the reception sleeve disposed opposite the disc, at least two pressure pins mounted in the bearing plate for displacement parallel to the mandrel axis and having at one end an inclined plane surface whose position and inclination is matched with the corresponding inclined plane surface of the disc, and their other end bearing against the pressure member.

5. A mandrel according to claim 4, wherein the disc is connected to the rod in a radially displaceable manner, the direction of displacement running perpendicular to the radii lying in the first mentioned inclined plane surfaces.

6. A mandrel according to claim 3, wherein the torsion device further comprises a pressure sleeve surrounding the pressure member, spring means by which the pressure sleeve bears against the pressure member and a stop surface on the mandrel with which one end of the pressure sleeve co-operates, the lengths of the pressure sleeve and spring means being adjusted to one another so that the pressure sleeve bears against the stop surface without fully compressing the spring means.

7. A mandrel according to claim 3, further comprising a base member having a securing flange in a shrinkage seat for securing the reception sleeve in the base member, the base member at least partially enclosing the torsion device.

8. A mandrel according to claim 2, wherein the clamping member comprises a flat splice plate which passes through the rod with a degree of tangential play.

9. A mandrel according to claim 8, wherein the contact surface between the clamping member and rod is convex.

10. A mandrel according to claim 8, wherein both ends of the clamping member have a profile corresponding to the gap between two adjacent teeth of the workpiece toothing.

11. A mandrel according to claim 8, wherein one end of the clamping member has a profile corresponding to the gap between two adjacent teeth of the workpiece toothing, and the other end has a bifurcated profile corresponding to the tooth profile.

12. A mandrel according to claim 4, wherein the torsion device further comprises a cardan joint between the pressure member and the pressure pins.

13. A mandrel according to claim 2, wherein the turning means further comprises a torsion device actuatable by tangential forces co-active with the one end of the rod remote from the clamping member, the torsion device comprising a disc engaging with the rod, the disc having a radial lug, a spring-loaded pressure pin engaging one face of the lug and a threaded spindle engaging the opposite face of the lug.

14. A mandrel according to claim 13, wherein the direction of force of the spring-loaded pressure pin is such that the clamping member is brought into the clamping position.

15. A mandrel according to claim 13, wherein the torsion device further comprises means defining a dead space acting in the circumferential direction and coupling the disc to the rod.

16. A mandrel according to claim 1, wherein the clamping member is disposed at the free end of the clamping length and the ends of the clamping member are arranged in front-end recesses of the reception sleeve.

17. A mandrel according to claim 16, wherein the turning means comprises a rod in the reception sleeve rigidly connected to the clamping member.

18. A mandrel according to claim 16, wherein the clamping member has a substantially triple star-shaped cross-section.

19. A mandrel according to claim 1, configured to be mounted between machine tool centers.

20. A mandrel according to claims 3 or 19 configured to be mounted between machine tool centers, wherein the pressure member comprises a threaded bolt and further comprising a club-shaped transmission member disposed between the inclined plane surfaces of the rod and the pressure member, which transmission member is mounted in an untorsionable manner with respect to the reception sleeve and for longitudinal movement and has two inclined plane surfaces that coincide as regards position and inclination with the inclined plane surfaces of the rod.

21. A mandrel according to claim 20, wherein the transmission member is mounted for oscillatory movement in the reception sleeve.

22. A mandrel according to claim 7, wherein the base member has a partially spherical surface on its rear end whose midpoint lies on the mandrel axis, and a coaxial disc having a conical recess associated with the spherical surface, and radially adjustably mounted in a corresponding recess.

23. A mandrel according to claim 1, wherein the turning means comprises a rod in the reception sleeve and a torsion device acting in the rod and comprising at least two balls mounted in guides radial to the mandrel axis, which are clampable in a radial direction, an externally operatable clamping device for clamping the guides, the clamping device having at least two surfaces oblique to the rod radius and disposed on the rod and on which the balls can roll upon the radial movement of their centers, producing a rotatory movement of the rod.

24. A mandrel of claim 23, wherein the oblique surfaces are cylinder part surfaces whose axes lie in a plane radial to the mandrel and are at an angle of about 45 degrees to those radii of the rod and which coincide with the axes of the guides of the balls and that the cylinder radius amounts to 1.01 to 1.15 times the ball radius.

25. A mandrel of claim 24, wherein the cylinder radius amounts to 1.08 times the ball radius.

26. A mandrel of claim 23, wherein the radial guides for the balls are disposed in a prolongation of the reception sleeve.

27. A mandrel of claim 23, wherein the oblique surfaces are disposed in a head joined with the rod whose diameter is greater than the rod diameter.

28. A mandrel of claim 23, wherein the clamping device comprises a sleeve which is longitudinally displaceable in the axial direction of the mandrel, and which has a number, of corresponding to the number of balls, of additional oblique surfaces on which the balls are movable upon axial movement of the sleeve, with radial movement of the ball centers.

29. A mandrel of claim 28, wherein the oblique surfaces are cylinder part surfaces whose axes are at an angle of 15 to 45 degrees to the mandrel axis and lie each in a plane passing through the mandrel axis, and that the radius of the cylinder part surfaces amounts to 1.01 to 1.15 times the ball radius.

30. A mandrel of claim 29, wherein the cylinder radius amounts to 1.08 times the ball radius.

31. A mandrel of claim 28 or claim 29, wherein the sleeve is joined to a power clamping drive.

32. A mandrel of claim 23, further comprising a clamping ring having at least one pressure screw which can be tightened radially against at least one of the balls associated with the radial guides.

33. A mandrel of claim 28 or claim 29, wherein the sleeve is provided with an external thread and with a threaded ring for moving the sleeve in the tightening direction.

* * * * *